United States Patent [19]
Bridges et al.

[11] 3,782,026
[45] Jan. 1, 1974

[54] PEST EXTERMINATING APPARATUS

[76] Inventors: William A. Bridges, Rt. 2, Box 49 D;
Charles L. Harris, Rt. 2, Box 31,
both of Luling, La. 70070

[22] Filed: Apr. 7, 1972

[21] Appl. No.: 242,108

[52] U.S. Cl. .................................................. 43/124
[51] Int. Cl. ................................................. A01m
[58] Field of Search ................... 43/124, 125, 127,
43/129, 138; 252/517, 169, 359; 239/568 X,
133; 219/273

[56] References Cited
UNITED STATES PATENTS

| | | | |
|---|---|---|---|
| 3,255,967 | 6/1966 | Kenney | 239/133 |
| 3,602,248 | 8/1971 | Peacock | 43/124 |
| 2,112,229 | 10/1936 | Davis | 43/124 |
| 1,925,643 | 9/1933 | Ofeldt | 43/125 |
| 2,114,494 | 4/1938 | Hummel et al. | 43/124 |

*Primary Examiner*—Louis G. Mancene
*Assistant Examiner*—Gregory E. McNeill
*Attorney*—Grover M. Myers

[57] ABSTRACT

An apparatus for exterminating pests such as roaches, ants and the like including a vaporizer unit for converting a liquid pesticide into a vaporous state and a distribution system for directing the pesticide in its vaporous state to desired locations. The distribution system will permit the vaporous pesticide to be emitted during the operation of the vaporizer unit. A portion of the pesticide which is reconverted into a liquid state during distribution will accumulate on the distribution system to produce a residual exterminating potential.

10 Claims, 7 Drawing Figures

PEST EXTERMINATING APPARATUS

BACKGROUND OF THE INVENTION

This invention relates to an apparatus and method for exterminating pests such as roaches, ants and the like, especially in buildings or enclosed areas such as houses, restaurants, warehouses, etc.

The elimination of roaches, ants and other such pests can be a very frustrating and expensive experience for the average home owner, restaurant owner or warehouse owner. Such pests initially enter a building from the outside through cracks in the walls of the building. They can be checked quite effectively if discovered in time without much expense. However, in the more normal situation, a home owner will usually ignore such pests until it is too late to eliminate them easily. By the time the home owner begins to take any corrective action these pests have begun breeding within the house, and it is almost impossible to eliminate them without going to great expense.

Roaches and other such pests usually breed within the walls of a house, behind and under cabinets and other similar inaccessible locations. They emerge from these breeding places from small spaces along the baseboard of the walls, and through spaces between cabinets, floors and walls.

In the past, a professional exterminating service has been the only effective method of dealing with such a pest problem. For such a service to be effective, however, periodic service calls are required so that a pesticide can be sprayed in various locations on the premises where the pests breed. Over a long period of time, this method of eliminating the pests can become quite expensive. Therefore, most home owners usually try to eliminate such pests by using one of the many different brands of insecticides such as Raid, Gulf Spray, Real Kill, etc., which are available in most supermarkets. These commercially available insecticides are usually packages in aerosol cans permitting an atomized mist to be directed in a desired direction and location.

Most of the time, these aerosol insecticide sprays are applied directly on a single pest by the user, and thus are very ineffective in eliminating the problem of breeding pests. Occasionally, a home owner will try to control the growth of the pest population by using these spray type insecticides by spraying the insecticide along the baseboard of the room and the cabinets and other likely pest breeding areas. It has been found that this is also a very ineffective method of eliminating the pest problem because these atomized sprays will not penetrate into the spaces between the walls where most of these pests breed. Furthermore, the residual effect of these spray type insecticides is short lived, and the added burden of repeated applications will be required. Such repeated applications can be almost as expensive as obtaining a professional exterminating service to do the job.

Although there are several presently known apparatus for exterminating pests, none of these apparatus will accomplish the objects of the subject invention, and they have disadvantages which the present invention is designed to overcome. Most of the presently known apparatus are of the fogger type which will vaporize a pesticide and discharge it into the atmosphere. These fogger devices cannot be used to direct the pesticide where it is most needed, and they have no residual effect since the vapors once dispensed from the device are subject to air currents and are easily dispersed.

Another disadvantage of these presently known fogger devices is their heating element. Most of these devices use a heating plate to vaporize the pesticide. It has been found that these plate type heating elements will tend to cool under a continuous application of a liquid pesticide and over a long period of time, a residue will build up on the plate and thereby reduce its efficiency.

The present invention has been designed to overcome the disadvantages of the professional exterminating service, the aerosol spray can insecticide and the fogger type devices.

SUMMARY OF THE INVENTION

It is, therefore, an object of this invention to provide an apparatus for use in controlling and eliminating a pest population in a building such as a house, restaurant, or warehouse.

Another object of this invention is to provide a vaporizer unit which can be used with any of the standard liquid pesticides and insecticides to vaporize a liquid pesticide for an initial exterminating effect.

Still another object of this invention is to provide a permanent distribution system which can be positioned throughout a building in likely pest breeding areas which will permit an initial vaporous atmosphere of pesticide to be emitted into a pest breeding area and will collect a portion of the pesticide to produce a long lasting residual exterminating effect.

Still another object of this invention is to provide an improved device for vaporizing pesticides which utilizes a vaporizer coil having a plurality of apertures to allow the vaporous pesticide to escape.

Still another object of this invention is to provide a distribution system for a pesticide which includes an elongated tubular sock woven in a predetermined pattern, thereby permitting a vaporous pesticide to escape through the sock wall along its entire length and permitting droplets of reconverted liquid pesticide to accumulate on the sock to maintain a residual exterminating effect for the distribution system over an extended period of time.

Still another object of this invention is to provide an exterminating apparatus which will overcome the disadvantages of the professional exterminating services, spray can insecticides, and fogger devices and will be inexpensive to manufacture and operate.

Still another object of this invention is to provide an exterminating apparatus which can be installed in pre-existing structures easily as well as being provided in new structures.

These and other objects are accomplished by the present invention through the use of a vaporizer unit which has a housing defining a vaporizing chamber. The housing is carried on a stand which can be positioned on the floor. One end of the housing has an exhaust nozzle or conduit which provides communication between the vaporizing chamber and a distribution system. A blower which is carried on the opposite end of the unit housing communicates with the vaporizing chamber and will produce an air flow through the chamber and distribution system.

A reservoir for a supply of a liquid pesticide is carried on the housing. Depending from the lower end of the reservoir is an inlet regulating conduit which extends into the vaporizing chamber within the housing. A valve means is associated with and positioned in the conduit to permit and restrict the flow of the pesticide from the reservoir into the regulating conduit. The lower end of the regulating conduit has a restricted opening or orifice to regulate the flow of the pesticide from the conduit.

Located within the vaporizing chamber is a resistance heating element or core which is surrounded by a tubular coil vaporizer. The inlet end of the coil vaporizer is contiguous to the lower end of the inlet conduit and receives the liquid pesticide as it is dispensed from the regulating conduit. Spaced at intervals around the tubular coil are exhaust apertures or openings. The vaporizer coil is in contact with the heating core so that it will be heated by the heater core.

When the apparatus is activated, the liquid pesticide is dispensed into the vaporizer coil and is converted into a vaporous state. The vapors escape from the coil through exhaust apertures and fill the vaporizing chamber. The blower unit forces the vapors in the vaporizing chamber through the distribution system which is attached to the exhaust conduit.

The distribution system includes an elongated tubular sock which is placed throughout the building structure at desired locations. The sock is woven in such a pattern that it will permit the vaporous pesticide to pass through its walls along its entire length, but it will accumulate any droplets of the pesticide which has been reconverted into the liquid state.

The apparatus is activated by a switch means which includes a timer unit that controls the operation of the solenoid valve, the heating element and the blower motor. When the unit is operated, the activating circuit will energize the solenoid valves and permit the liquid pesticide in the reservoir to flow into the regulating conduit. The heating element will be energized and thus the vaporizer coil will be heated as the droplets of pesticide drop from the regulating conduit into the vaporizer coil. The pesticide will be vaporized and pass in a vaporous state into the vaporizer chamber through the exhaust apertures in the vaporizer coil. The blower or centrifugal fan will also be energized and force the vapors from the vaporizer chamber into the tubular sock.

BRIEF DESCRIPTION OF THE DRAWINGS

The foregoing and additional objects, features and advantages of the present invention will be apparent to those skilled in the art from the following detailed description of a preferred embodiment taken with the accompanying drawings, in which.

DESCRIPTION OF A PREFERRED EMBODIMENT

Figure 1:
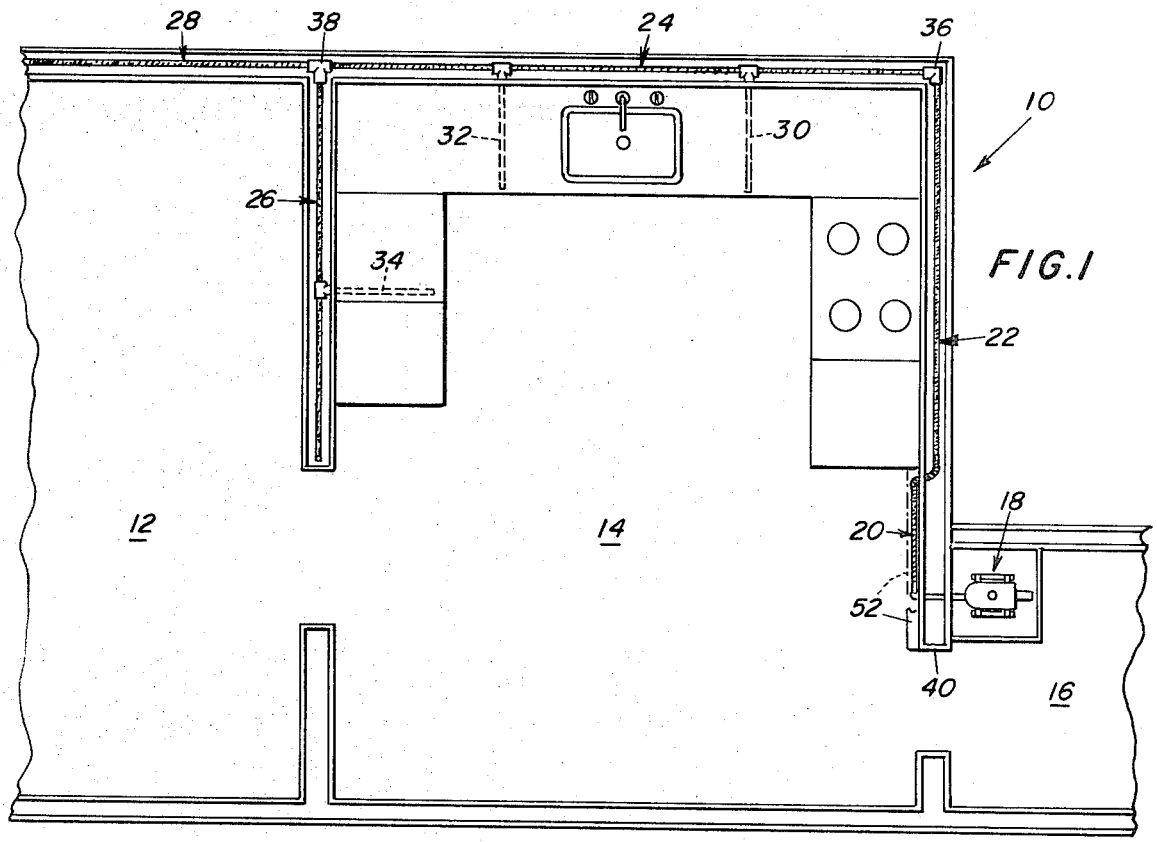
FIG. 1 is a portion of a floor plan of a house illustrating a vaporizer unit and distribution system according to the present invention.

Referring more particularly to the drawings, in FIG. 1, the numeral 10 indicates a portion of an existing or newly constructed house illustrating three rooms, a dining room 12, a kitchen 14 and a utility room 16. A vaporizer unit 18 according to the subject invention is located within the utility room 16. The unit can be enclosed within a cabinet or other suitable enclosure, if desired. The distribution system according to the subject invention is illustrated at 20, 22, 24, 26 and 28. The distribution system at 20 is carried within the quarter round molding adjacent the wall, baseboard and floor at 20 (see FIG. 2). The portion of the distribution system illustrated at 22, 24, 26 and 28 is carried within the wall itself. Branches of the distribution system illustrated at 30, 32 and 34 may be routed into cabinets or laid between the cabinets or other appliances such as refrigerators, stoves, etc. At branches or curves within the distribution system there can be a rigid elbow circuit, as disclosed at 36, or a T-connection as disclosed at 38.

Figure 2:
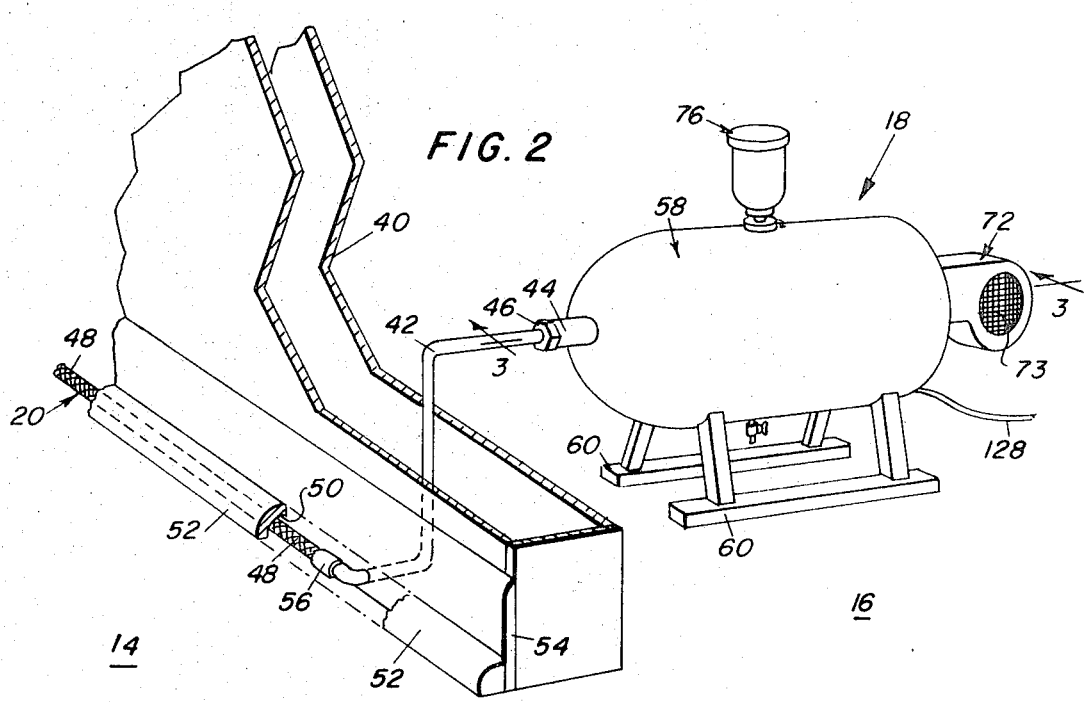
FIG. 2 is a perspective view of the vaporizer unit and the distribution system as installed in a pre-existing structure, the distribution system being installed along the baseboard of a room.
Figure 3:
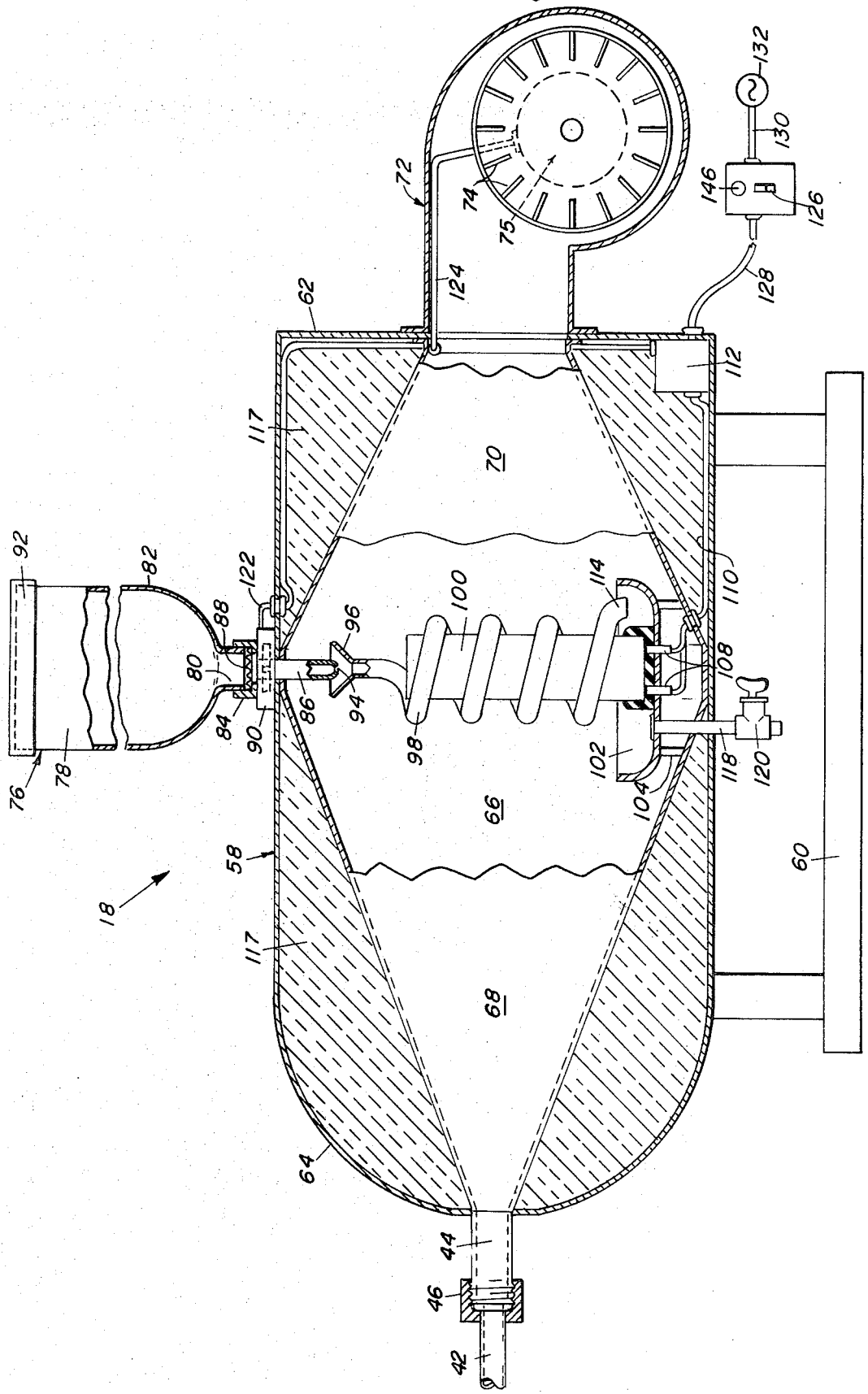
FIG. 3 is a cross section view of the vaporizer unit according to the present invention taken on line 3—3 of FIG. 2.

As illustrated in FIGS. 1 and 2, the vaporizer unit 18 is positioned in the utility room 16 and has the distribution system extending through the wall 40 between the kitchen and utility room. The distribution system has a tube portion 42 which is attached to an exhaust or outlet conduit 44 of the vaporizer unit 18 by a suitable coupling 46. The tube 42 can be a rigid or flexible pipe and can be plastic, stainless steel or any other desired material. Preferably, the tubing will be approximately three-eighths inch in diameter. The tubing extends from the vaporizer unit 18 to a tubular distribution sock 48 which is positioned in a groove 50 beneath the quarter round molding 52 along the baseboard 54 of wall 40. The sock 48 can be secured to the tubing 42 by a clamp 56, tape or other suitable means. It should be understood that the tubing can be of any length desired. Other sections of tubing can be used to join a plurality of sock portions in a manifold type arrangement or in an end-to-end relationship. The sock portion 48 of the distribution system will be described in detail hereinafter.

The vaporizer unit 18 has a housing 58 which is mounted on skid supports 60. Any other suitable way of mounting the vaporizer unit may be utilized. In this preferred embodiment, the vaporizer unit is portable, so that it can be disconnected from the tube 42 of the distribution system at the coupling joint 46. The unit is made portable in the event that it becomes inoperative and requires service or in the event that several inlets for the distribution system are positioned throughout the premises; thus, the vaporizer unit may be moved to various locations throughout the building when desired. In the event the vaporizer unit is moved to another location, a cap would be provided to insert into the coupling 46 of the inlet tube 42.

In the preferred embodiment, illustrated in the drawings, the housing 58 of the vaporizer unit 18 is generally cylindrically shaped having a circular rear end 62 and a spherical forward end 64. As can be seen in FIG. 3, a vaporizing chamber 66 is formed within the housing 58 and extends from the rear wall 62 of the housing to the forward wall 64. The chamber 66 is formed by a conically shaped forward section 68 and frustum conical rear section 70. The apex of the forward conical section 68 has an aperture which is connected to outlet conduit 44, thereby permitting communication between the outlet conduit 44 and the chamber 66. The rear section 70 extends from approximately the center of the housing to the rear wall 62. The smaller end of the section is adjacent the rear wall 62 and is open to permit communication with a blower or fan housing 72 secured to the rear plate 62 of the vaporizer unit housing 58.

The fan housing 72 has an inlet screen portion 73 and carries a centrifugal fan 74. The fan is mounted for rotation by suitable bearing means and is driven by suitable motor means 75 such as a 0.9–1.0 amp AC motor. In the preferred embodiment, the fan will preferably have a capacity of 15 to 20 cubic feet/min. The size of the fan and power of the motor can be varied depending upon the size of the distributing system and the area to be protected.

A reservoir assembly 76 is carried on the present unit housing 58. The reservoir assembly includes a reservoir 78 having a neck portion 80 and an open ended cylindrical portion 82. The neck portion is inserted into an annular receiving portion 84 which is secured on the upper end of an inlet regulating conduit 86. The neck portion can be sized so that it fits snugly within the annular receiving portion or may have a threaded portion to be screwed into the annular receiving portion. A filter screen 88 is provided within the annular portion 84 to screen out any debris which may collect in the reservoir. Preferably the reservoir will be approximately 3 to 4 inches in height and 2 inches in diameter. It has been found that a reservoir of this size will hold a 9 to 12 month supply of pesticide.

A solenoid valve 90 is carried on the housing 58 and is associated with regulating conduit 86. In the preferred embodiment, the solenoid valve has a one-sixteenth inch opening and the regulating conduit 86 is one-fourth inch line. The opening and closing of the valve permits and restricts the flow of pesticide from the reservoir 78 into the regulating conduit 86. The reservoir 78 has a cap 92 over its open end which can be removed to permit the reservoir to be refilled.

The inlet regulating conduit 86 extends through the wall of the vaporizer unit housing 58 and its lower end 94 is formed into a regulating orifice or opening which will restrict the inlet flow of pesticide and regulate the amount of pesticide to approximately 1 drop/15 to 20 seconds.

Located directly below the inlet conduit 86 is the flared end 96 of vaporizer coil 98. In the preferred embodiment, the coil is made of a one-half inch stainless steel tube which is wrapped snugly around a resistance heating element or core 100, preferably with a 300–400 watt rating. The contacting surfaces of the heating element and coil are sufficient to transfer the heat between the core and the coil. The heating core stands within a bowl 102 which is carried on a platform or stand 104. The lower end of the heating core 100 carries a ceramic or rubber insulator 106 which insulates the coil from the bottom of the bowl 102. Coil contacts or terminals 108 extend through the bottom of the bowl and are connected to wires 110 which are connected to a timer unit 112 carried within the housing 58.

Figure 4:
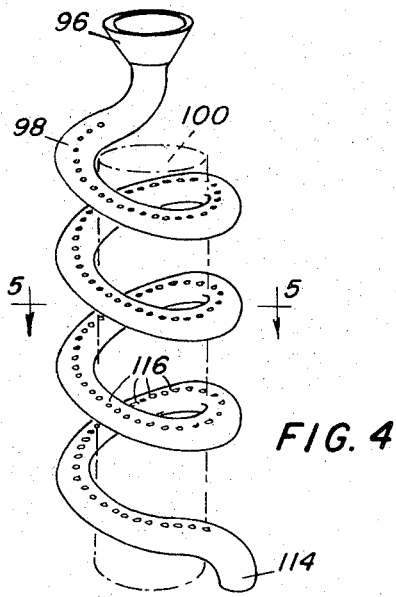
FIG. 4 is a detail perspective view of the vaporizer coil removed from the vaporizer unit according to the present invention.
Figure 5:
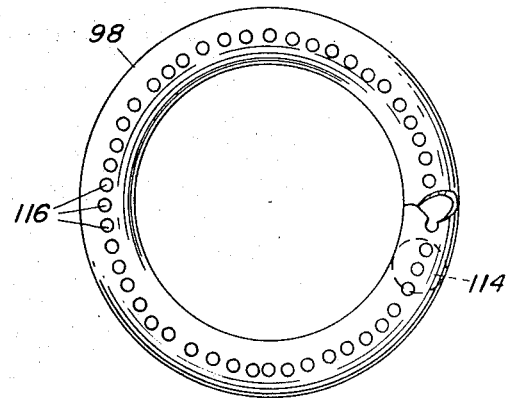
FIG. 5 is a cross section view of the vaporizer coil taken on line 5—5 of FIG. 4.

The lower end 114 of the vaporizer coil 98 is turned downwardly and opens into bowl 102. A plurality of apertures 116 (see FIGS. 4 and 5) are spaced on the upper side of the vaporizing coil 98. The apertures are approximately one-eighth inch in diameter and are approximately one-eighth inch apart. The apertures permit the vaporized pesticide to escape into the vaporizer chamber 66. This coil type vaporizer will reduce the cooling effect of the continuous flow of pesticide which is experienced in the presently known plate type vaporizer elements and will reduce the residual build up. The coil element also reduces the possibility of chemical breakdown of the pesticide compound.

An insulating material 117 can be used between the conical section 68 and 70, and the housing 58. The insulating material will maintain the temperature within the vaporizing chamber and prevent the pesticide from reconverting into a liquid before entering the distribution system. Any excess pesticide which is not vaporized will flow through the coil and exit the coil at the lower end 114 into bowl 102. The bowl 102 is provided with a drain conduit 118 equipped with a spigot 120 to permit the excess pesticide to be drained from the bowl and reused.

Solenoid valve 90 and the motor 75 for the centrifugal fan 74 are connected through wires 122 and 124, respectively, to the timer unit 112. The timer unit is connected to switch 126 by wire 128. The switch is connected by 130 to a suitable power source 132.

Figure 7:
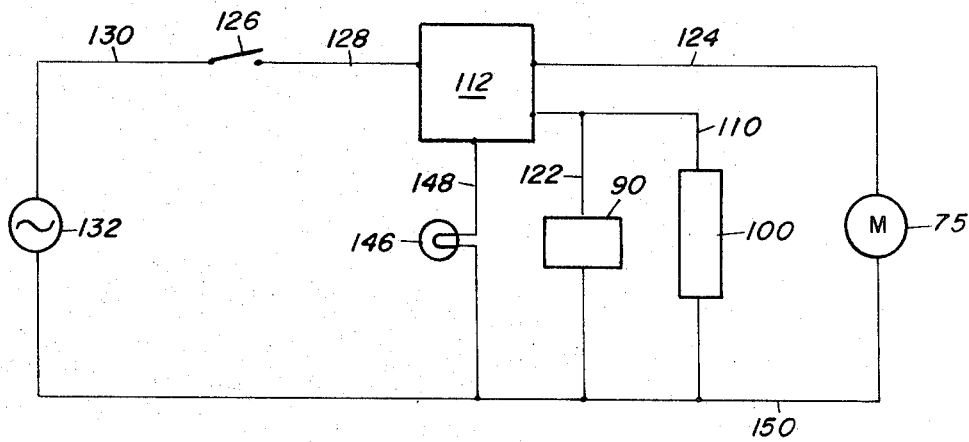
FIG. 7 is a schematic of the electrical control circuit according to the subject invention.

In FIG. 7 is illustrated a schematic of the electrical control circuit for the vaporizing unit. The power source 132 is connected through line 130 to switch 126. Switch 126 is connected to the resettable timer unit 112 by line 128. Timer unit 112 is connected through line 124 to centrifugal drive motor 75, through line 122 to solenoid 90 and through line 110 to heating core 100. An indicator light 146 is provided in the circuit and is connected to the timer unit 112 through line 148. Motor 75, solenoid 90, core 100 and indicator light 146 are connected through line 150 to the ground side of the power source 132. When switch 136 is closed, the timer unit is activated so that the fan motor 75, the solenoid valve 90 and the heating coil 100 and lamp 146 are energized. Preferably, the timing unit 112 has a maximum run time of 30 minutes and can be of any suitable type which will permit sequential deactivation of the control circuit so that solenoid 90 and core 100 will deactivate approximately 1 minute prior to deactivation of fan motor 75. Upon deactivation of the fan motor 75, all circuits in timer units are opened, thus indicator light 146 will be extinguished to indicate to the user that the unit has been deactivated. The timer should also be either resettable manually by operating switch 126 or have an automatic resetting mechanism.

Figure 6:
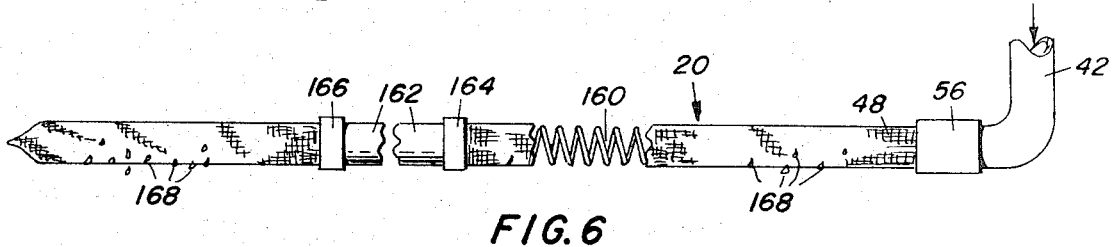
FIG. 6 is a side view of the distribution sock according to the subject invention.

Turning now to the distribution system, as illustrated in FIGS. 1, 2 and 6, the distribution system 20 includes an inlet tube 42 which can be made of a plastic tubing and which is secured at connector or coupling 46 to the exhaust nozzle 44 of the vaporizer unit. The tubing 42 may be run as far as required, depending upon where it is desirable to attach a sock portion of the distribution system. The sock on the distribution system is connected to tubing 42 by a clamp 56 or other suitable means and is routed to desired locations, as for example, along the baseboard of a room as shown in FIG. 2. The sock is a cylindrical tube of woven filaments made of nylon, cotten, or the like. Nylon is preferred, however, to provide strength to the sock structure and reduce wear. The sock is woven in a predetermined pattern which will permit the vapors which are directed through the sock to escape along its entire length. A coil spring 160 (see FIG. 6) is provided to prevent the sock from collapsing. Any arrangement of socks can be utilized in the distribution system and where it is desirable to prevent the vapors from escaping, a conduit 162 may be provided. The conduit will be clamped by suitable means 164 and 166 to the various sock portions of the distribution system. As mentioned above, the weave pattern of the sock is such that the vapors are permitted to escape along its length; however, it has been found that a portion of the pesticide will be reconverted to a liquid state with the distribution system, so that droplets of liquid pesticide 168 will collect and accumulate a residue on the sock. These droplets permit the sock to maintain its exterminating potential for an extended period of time.

OPERATION

The vaporizer unit and distribution system operates in the following manner. A suitable pesticide is placed within the reservoir 78. Upon activation of the vaporizer unit 18 by switch 126, solenoid valve 90 operates to permit the liquid pesticide to pass into the inlet regulating conduit 86. The filter screen 88 prevents any debris from passing into the inlet conduit, thus preventing the debris from blocking the regulating orifice 94 at the end of the inlet tube 86. The drops of pesticide pass into the vaporizing coil through the upper flared mouth 96. The heating core is activated upon operation of switch 126 and will heat the vaporizer coil to a predetermined temperature. As the liquid pesticide passes into the heated coil, it is vaporized. The vapors pass through the openings 116 in the vaporizer coil and into the vaporizing chamber 66. Any liquid pesticide which is not vaporized in the coil will pass through the lower end opening 114 of the coil into bowl 102 where it is collected. The blower or centrifugal fan motor 75 which has been activated upon operation of switch 126 causes a flow of air through the vaporizer chamber forcing the vapors into the distribution system 20. The vapors enter the distribution system through conduit 42 which is connected to the various socks of the system. The vapors passing through the socks will kill any pest in the area. The pesticide which is reconverted into liquid within the distribution system will collect on the sock in droplets, thereby wetting the sock to provide a lasting exterminating potential. It is contemplated that the vaporizer unit will operate for approximately 15 to 20 minutes before shut down. Shut down is regulated by the timer 112 which will close solenoid valve 90 and deactivate heating element 100 approximately 1 minute prior to shut down of the centrifugal fan 74. This permits all vapors which have been produced within the chamber to be blown through the system prior to shut down. As the blower fan de-energizes, all circuits in the timer will become open and the indicator light 146 will extinguish.

It can be seen from the above description and drawings that the apparatus described hereinabove provides an exterminating apparatus for pests which will utilize a vapor to produce an initial vaporous extermination and will have a residual extermination potential which will permit extermination of pests over a long period of time. The operation of the device is inexpensive, since many commercially available liquid pesticides can be used. It is also very effective in eliminating pests in their breeding areas.

As will be apparent to those skilled in the art, there are many variations and changes which can be made to the exterminator apparatus; for example, the shape of the housing may be varied in any desired manner, the timer unit may be combined with the switch, and other changes to the specific structural elements can be made to the above described and illustrated invention without departing from the true spirit and scope thereof as defined in the following claims.

What is claimed is:

1. An apparatus for exterminating pests such as roaches, ants and the like within a building structure comprising:
   a. a housing having a chamber therein;
   b. reservoir means carried on said housing for storing a supply of pesticide and directing said pesticide into said housing chamber;
   c. vaporization means located within said housing chamber for receiving and converting said pesticide into a vaporous state;
   d. blower means carried on said housing which communicates with said housing chamber for forcing the pesticide vapors from said chamber;
   e. means for distributing said vapors to remote locations within said building structure, said means for distributing including at least one tubular woven member being adapted to permit said vapors to escape through its walls along its entire length, some of said vapors being reconverted into a liquid state as the pesticide passes through the walls of the tubular member so that a residue will accumulate on the tubular member, said residue permitting the means for distributing to maintain its exterminating potential for an extended period of time; and
   f. activating means for said apparatus.

2. The apparatus of claim 1, wherein said tubular woven member having a preselected weave pattern which will permit a predetermined volume of vaporous pesticide to be emitted from the tubular member during a specific period of time, said tubular member collecting a residual portion of said pesticide resulting from the reconversion of said vaporous pesticide into a liquid state.

3. The apparatus of claim 2, wherein said tubular woven member is made of nylon.

4. The apparatus of claim 2, wherein said vaporization means includes:
   a. a heating element carried within said housing; and
   b. a vaporizer coil encircling said heating element, said coil having an inlet end associated with said reservoir means for receiving said liquid pesticide and a plurality of spaced exhaust apertures along its length through which the vaporous pesticide escapes into the housing chamber.

5. The apparatus of claim 1, wherein said reservoir means includes:
   a. a container for receiving a supply of liquid pesticide;
   b. a conduit having one end connected to said container and extending into said housing cavity, the other end of said conduit having a restricting aperture to regulate the flow of said pesticide into said vaporization means; and c. valve means associated with said container and said conduit and operated by said activating means to permit and restrict the flow of said liquid pesticide from said container into said conduit.

6. The apparatus of claim 1, wherein said vaporizer means includes:
   a. a heating element carried within said housing cavity; and
   b. a vaporizer coil encircling said heating element, said vaporizer coil having an inlet end associated with said reservoir means for receiving said liquid pesticide and a plurality of spaced exhaust apertures along its length through which the vaporous pesticide is emitted into the housing chamber.

7. The apparatus of claim 6, wherein said reservoir means includes:
   a. a container which carries a supply of liquid pesticide;
   b. a conduit having one end connected to said container and extending into said housing, the other end of said conduit having a restricting aperture to regulate the flow of said liquid pesticide into said vaporizer coil; and
   c. valve means associated with said container and said conduit and operated by said actuating means to permit and restrict the flow of pesticide from the container into said conduit.

8. The apparatus of claim 7, wherein said tubular woven member having a preselected weave pattern which permits a predetermined volume of vaporous pesticide to be emitted from said tubular member during a specific period of time, said tubular member collecting a residual portion of said pesticides resulting from the reconversion of said vaporous pesticide into a liquid state.

9. The apparatus of claim 7, wherein said activating means includes:
   a. switch means for energizing said valve means, said heating element and said blower means; and
   b. timer means for de-energizing said valve means, said heating element and said blower means at preselected times, said blower means being de-energized subsequent to said valve means and said heating element.

10. A method of exterminating pests such as roaches, ants and the like through an inital application of a pesticide in a vaporous state and a residual application of said pesticide over an extended period of time including the steps of:
   a. positioning a tubular woven member in a desired location frequented by such pests;
   b. converting a liquid pesticide into a vaporous state;
   c. directing said vaporous pesticide through said tubular woven member so that the vaporous pesticide is emitted along the entire length of said member; and
   d. accumulating a residue of said pesticide on said member due to a reconversion of a portion of said pesticide from a vaporous to a liquid state, said residue permitting said member to maintain exterminating properties for an extended period of time.

* * * * *